United States Patent
Bak et al.

(10) Patent No.: US 10,331,968 B2
(45) Date of Patent: Jun. 25, 2019

(54) ONE SHOT COLOR CALIBRATED METRIC LEARNING FOR OBJECT RE-IDENTIFICATION

(71) Applicant: Disney Enterprises, Inc., Burbank, CA (US)

(72) Inventors: Slawomir W. Bak, Pittsburgh, PA (US); G. Peter K. Carr, Allison Park, PA (US)

(73) Assignee: Disney Enterprises, Inc., Burbank, CA (US)

( * ) Notice: Subject to any disclaimer, the term of this patent is extended or adjusted under 35 U.S.C. 154(b) by 2 days.

(21) Appl. No.: 15/469,334

(22) Filed: Mar. 24, 2017

(65) Prior Publication Data
US 2018/0276499 A1 Sep. 27, 2018

(51) Int. Cl.
*G06K 9/62* (2006.01)
*G06K 9/46* (2006.01)
*G06K 9/00* (2006.01)
*G06K 9/66* (2006.01)

(52) U.S. Cl.
CPC ....... *G06K 9/4652* (2013.01); *G06K 9/00771* (2013.01); *G06K 9/00369* (2013.01); *G06K 9/6215* (2013.01); *G06K 9/66* (2013.01)

(58) Field of Classification Search
CPC ............. G06K 9/6255; G06K 9/00718; G06K 9/4652; G06K 9/6215; G06K 9/6277; G06K 9/66
See application file for complete search history.

(56) References Cited

U.S. PATENT DOCUMENTS

| 2011/0085697 A1* | 4/2011 | Clippard | G06K 9/4652 382/100 |
| 2013/0343642 A1* | 12/2013 | Kuo | G06K 9/6256 382/159 |

(Continued)

OTHER PUBLICATIONS

O. Javed, K. Shafique, M. Shah, Appearance modeling for tracking in multiple non-overlapping cameras, IEEE Conference on Computer Vision and Pattern Recognition, vol. 2. 2005, pp. 26-33.*

(Continued)

*Primary Examiner* — Bhavesh M Mehta
*Assistant Examiner* — Ian L Lemieux
(74) *Attorney, Agent, or Firm* — Patterson + Sheridan, LLP

(57) ABSTRACT

Techniques for detecting objects across images captured by camera devices. Embodiments capture, using first and second camera devices, first and second pluralities of images, respectively. First and second reference images are captured using the first and second camera devices. Color descriptors are extracted from the first plurality of images and the second plurality of images, and texture descriptors are extracted from the first plurality of images and the second plurality of images. Embodiments model a first color subspace and a second color subspace for the first camera device and the second camera device, respectively, based on the first and second pluralities of images and the first and second reference images. A data model for identifying objects appearing in images captured using the first and second camera devices is generated, based on the extracted color descriptors, texture descriptors and the first and second color subspaces.

17 Claims, 6 Drawing Sheets

(56) References Cited

U.S. PATENT DOCUMENTS

| | | | |
|---|---|---|---|
| 2014/0241620 A1* | 8/2014 | Zhang | G06K 9/4661 |
| | | | 382/159 |
| 2015/0036883 A1* | 2/2015 | Deri | G06K 9/00771 |
| | | | 382/103 |
| 2017/0256057 A1* | 9/2017 | Bak | G06T 7/0044 |

OTHER PUBLICATIONS

Xiong, F., et al., "Person Re-Identification using Kernel-based Metric Learning Methods", ECCV. (2014), 16 pages. <http://robustsystems.coe.neu.edu/sites/robustsystems.coe.neu.edu/files/systems/papers/FeiXiong_ECCV14.pdf>.

Hu, J., et aL, "Deep Transfer Metric Learning", The IEEE Conference on Computer Vision and Pattern Recognition (CVPR), 2015, pp. 325-333 <http://www.cv-foundation.org/openaccess/content_cvpr_2015/html/Hu_Deep_Transfer_Metric_2015_CVPR_paper.html>.

Kodirov, E., et al., "Dictionary Learning with Iterative Laplacian Regularisation for Unsupervised Person Re-Identification", School of Electronic Engineering and Computer Science, Queen Mary University of London, BMVC (2015), 12 pages. <https://www.eecs.qmul.ac.uk/~sgg/papers/KodirovEtAl_BMVC2015.pdf>.

McCamy, C., et al., "A Color-Rendition Chart", Journal of Applied Photographic Engineering, vol. 2, No. 3, Summer 1976, 6 pages.

Su, C., et al., "Multi-Task Learning with Low Rank Attribute Embedding for Person Re-identification", 2015 IEEE International Conference on Computer Vision, Dec. 7-13, 2015, 9 pages.

Chen, D., et al., "Similarity Learning on an Explicit Polynomial Kernel Feature Map for Person Re-Identification", The IEEE Conference on Computer Vision and Pattern Recognition (CVPR), 2015, pp. 1565-1573 <http://www.cv-foundation.org/openaccess/content_cvpr_2015/html/Chen_Similarity_Learning_on_2015_CVPR_paper.html>.

Zhao, R., "Unsupervised Salience Learning for Person Re-identification", 2013 IEEE Conference on Computer Vision and Pattern Recognition, Jun. 23-28, 2013, pp. 3586-3593 <http://www.cv-foundation.org/openaccess/content_cvpr_2013/papers/Zhao_Unsupervised_Salience_Learning_2013_CVPR_paper.pfd>.

Bhi, Z., et al., "Transferring a Semantic Representation for Person Re-Identification and Search", The IEEE conference on Computer Vision and Pattern Recognition (CVPR), 2015, pp. 4184-4193 <http://www.cv-foundation.org/openaccess/content_cvpr_2015/html/Shi_Transferring_a_Semantic_2015_CVPR_paper.html>.

* cited by examiner

ONE SHOT COLOR CALIBRATED METRIC LEARNING FOR OBJECT RE-IDENTIFICATION

BACKGROUND

Field of the Invention

The present disclosure relates to digital video processing, and more specifically, to techniques for unsupervised learning for recognizing objects appearing across multiple, non-overlapping video streams.

Description of the Related Art

Object identification is useful in many different fields. However, many conventional techniques require the individual objects be affirmatively registered with the recognition system, and thus are ill-suited for situations in which many objects (such as people, animals, devices. vehicles and other things) are moving quickly through a location (e.g., an airport). Image processing techniques can be used to recognize objects within frames captured by a camera device. One challenge when detecting objects across multiple camera devices is handling variations in lighting, camera position and object pose across multiple camera devices. For instance, an object may have a certain set of color characteristics in an image captured by a first camera device as a function of the ambient light temperature and direction as well as the first camera device's image sensor and processing electronics, and may be captured with different color characteristics in an image captured by a different camera device. As a result, conventional techniques for determining that objects captured across images from multiple camera devices are indeed the same object may be inaccurate.

SUMMARY

Embodiments provide a method, system, and computer-readable medium that include capturing, using a first camera and a second camera, a first plurality of images and a second plurality of images, respectively. A first and a second reference image are captured using the first and second cameras. Color descriptors and texture descriptors are extracted from the first plurality of images and the second plurality of images. A first color subspace and a second color subspace are modelled for the first camera and the second camera, respectively, based on the first and second pluralities of images and the first and second reference images. A data model for identifying objects appearing in images captured using the first and second cameras is generated, based on the extracted color descriptors, texture descriptors and the first and second color subspaces.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
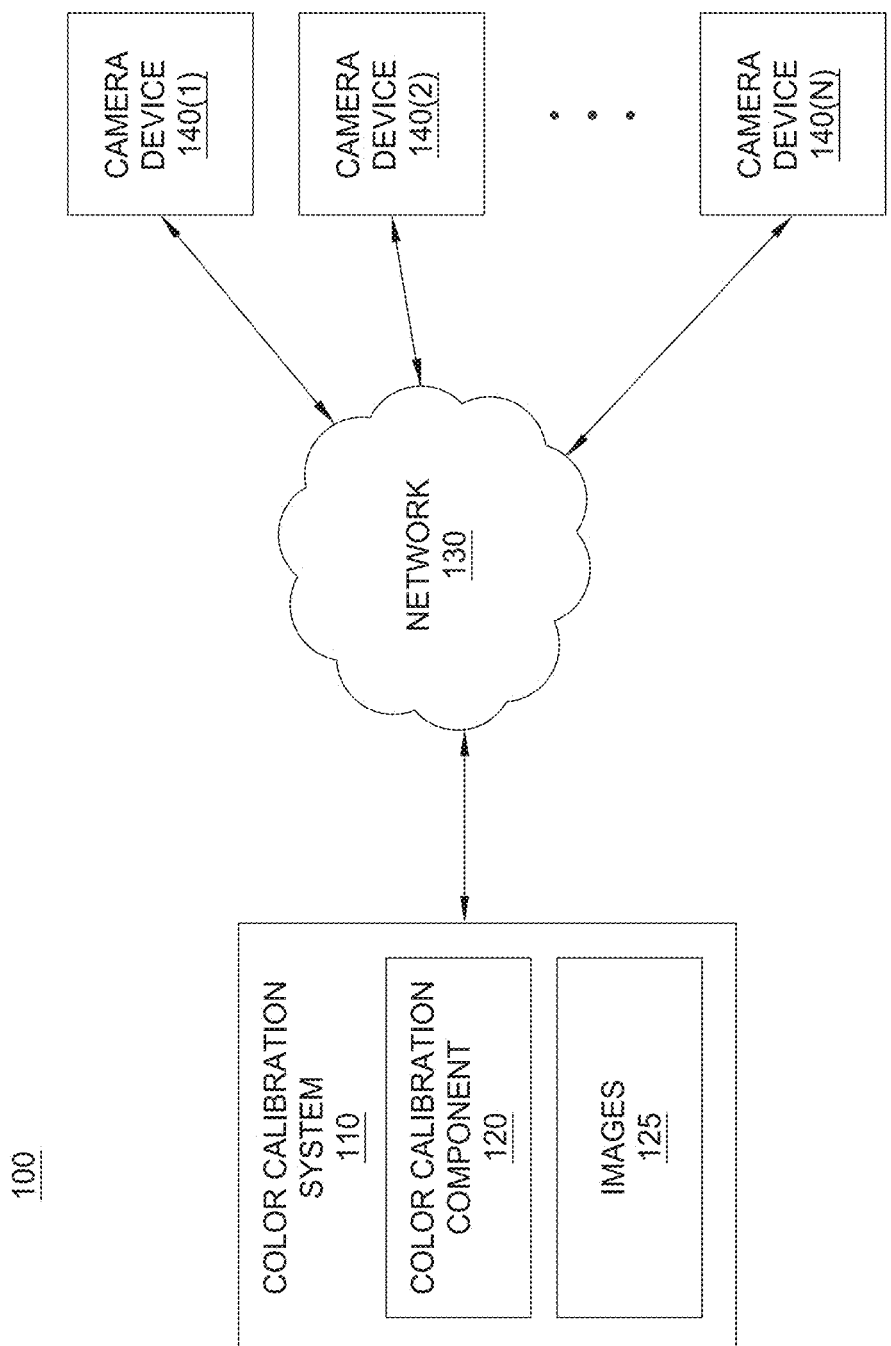
FIG. 1 is a system configured with a color calibration component, according to one embodiment described herein.

Generally, object re-identification refers to the technical challenge of identifying when an object, such as a person, item, animal, vehicle or other thing, appearing in an image(s) captured using a first video camera subsequently appears in an image(s) captured using a second, non-overlapping video camera. Object re-identification approaches can generally be divided into unsupervised and supervised approaches. Unsupervised approaches focus on designing features (often handcrafted) that should be robust to changes in imaging conditions. On the other hand, supervised methods usually employ metric learning that uses training data to search for effective distance functions for comparing images of objects captured from different cameras. Supervised methods typically learn a trade-off between feature invariance and their discriminative power directly from data, thus achieving better performance than conventional unsupervised approaches. By maximizing inter-class variations and minimizing intra-class variations, such supervised learning techniques look for optimal feature embedding to then perform object re-identification.

Many different machine learning algorithms can be used for learning a robust similarity function. Such algorithms may include, for example, feature selection and weighting, as well as defining object re-identification as a ranking problem and using an ensemble of Ranking Support Vector Machines (SVMs). A Ranking SVM refers to a variant of a Support Vector Machine configured for ranking elements of a data set based on attributes of the elements. Additionally, or alternatively, the family of Mahalanobis distance functions can be used for learning a metric. A Mahalanobis distance can directly model the transition in feature space between two camera views, and thus may achieve better performance than the similarity functions directly learnt in the original feature space. Mahalanobis metric learning usually aims at improving k nearest neighbor (k-nn) classification by iteratively adapting the metric (e.g., Large Margin Nearest Neighbor Learning (LMNN), Information Theoretic Metric Learning (ITML), Logistic Discriminant Metric Learning (LDML)). Other algorithms include the Keep It Simple and Straightforward (KISS) metric which uses a statistical inference based on a likelihood-ratio test of two Gaussian distributions modeling positive and negative pairwise differences between features. The KISS metric has further been extended to linear and non-linear subspace embeddings. Mahalanobis metric learning approaches usually require hundreds of labeled image pairs to produce effective similarity measures.

Embodiments described herein provide techniques for object re-identification across multiple, non-overlapping camera devices. Generally, solutions for re-identifying objects in surveillance scenarios must deal with significant changes in appearance caused by variations in illumination, viewing angle and an object's pose. Unlike conventional metric learning approaches that learn a distance measure using hundreds or thousands of annotated subjects, embodiments described herein provide techniques for learning a metric using a one shot learning approach, in which a data model is trained using one (or only a few) images for each camera device. Embodiments described herein learn a texture feature representation that is invariant across datasets, and account for differences in camera color distributions by sampling patches on registered images of a color calibration target (e.g., a ColorChecker® board).

One embodiment provides a method for object re-identification that includes capturing, using each of a plurality of camera devices, a respective plurality of images. Additionally, the method includes capturing, from each of the plurality of camera devices, a respective reference image. The method also includes modelling a color subspace for each of the plurality of camera devices, based on the plurality of images and the respective reference image captured using the respective camera device. The method further includes modelling color descriptors extracted from the respective plurality of images for each of the plurality of camera devices, using the modelled color subspace, and modelling texture descriptors extracted from the respective plurality of images for each of the plurality of camera devices. A data model is then generated for re-identifying objects appearing in images captured using two or more of the plurality of camera devices, based on the modelled color descriptors and the modelled texture descriptors.

FIG. 1 is a system configured with a color calibration component, according to one embodiment. System 100 includes a color calibration system 110, connected to a plurality of camera devices 140(1)-(N) via a network 130. The color calibration system 110 includes a color calibration component 120 and stored images 125. The images 125 comprise data representing images captured using the camera devices 140(1)-(N). In the example, the camera devices 140(1)-(N) represent non-overlapping (i.e., images captured by different camera devices of the camera devices 140(1)-(N), where each camera device captures images of a unique physical location) surveillance cameras positioned throughout a location (e.g., an airport). The network 130 generally represents a communications network (e.g., a wired communications network, a wireless communications network, etc.) suitable for transferring data between the camera devices 140(1)-(N) and the color calibration system 110.

The color calibration component 120 is generally configured to analyze the images 125 and to perform an object re-identification operation to determine when an object who appeared within one or more images captured by one of the camera devices 140(1)-(N) appears within one or more images captured by a different one of the camera devices 140(1)-(N). Generally, object re-identification across the camera devices 140(1)-(N) can be used for a number of purposes. For instance, the location of a particular object of interest could be tracked throughout the camera devices 140(1)-(N). As another example, the color calibration component 120 could access data specifying the geographical locations of the camera devices 140(1)-(N), and the camera devices 140(1)-(N) could perform object re-identification techniques to track the flow of objects throughout a venue (e.g., an airport, a train station, etc.). Moreover, the color calibration component 120 could use the positions of objects, combined with the geographical locations of the camera devices 140(1)-(N), to estimate the time it takes the objects to traverse parts of the venue. For instance, the color calibration component 120 could estimate the travel time between particular locations at a site (e.g., an airport), based on the time it takes objects (e.g., individuals) to appear in a particular camera (e.g., a gate for a flight), after appearing in another camera (e.g., a security checkpoint).

The color calibration component 120 can perform a learning process through which the color calibration component 120 learns positive covariance of color feature differences and covariance of texture feature differences across camera devices. As the covariance of color feature differences can vary greatly between camera devices (e.g., due to differences in the cameras, due to differences in the lighting conditions where the camera devices are located, etc.), the color calibration component 120 can learn the covariance of color feature differences specifically for the cameras 140(1)-(N). On the other hand, as the covariance of texture feature differences can be assumed to be relatively constant between camera devices, the color calibration component 120 can learn the covariance of color feature differences from an annotated set of images in an auxiliary image library (e.g., images captured from cameras other than the cameras 140(1)-(N)).

In learning the covariance of color and texture feature differences, the color calibration component 120 could divide each of the images 125 into a respective plurality of patches. Each patch is a distinct, fixed size portion of the respective image. In a specific embodiment, each patch comprises a 24×12 pixel region of the image. More generally, any size patch can be used, consistent with the functionality described herein. Each patch can then be extracted from the image by retrieving pixel values for the pixels within the pixel region for the respective patch.

The color calibration component 120 then extracts color and texture descriptors from each patch. In one embodiment, the color calibration component 120 could apply a dimensionality reduction on the texture descriptors. Doing so can help to improve the performance and the accuracy of machine learning models processing the texture descriptors by avoiding over-fitting of covariance matrices learned from the color and texture descriptors. Additionally, such dimensionality reduction can help to reduce the amount of computing resources needed for the object re-identification. For example, the color calibration component 120 could perform a principal component analysis operation to reduce the dimensionality of the texture descriptors. More generally, however, any dimensionality technique can be used, consistent with the functionality described herein. The color calibration component 120 then applies a metric learning algorithm on the reduced dimensionality texture descriptors using an auxiliary labeled data set.

In learning the covariance of color feature differences, the color calibration component 120 could then acquire a single image of a color calibration chart from each of the camera devices 140(1)-(N). In one embodiment, the color calibration chart comprises a grid of various different colors, and the color calibration component 120 can use the appearance of the chart within images captured by the various camera devices to normalize the color space between the camera devices. The color calibration component 120 divides the portion of a captured image that depicts the chart into a plurality of patches, and for each patch, the color calibration component 120 extracts color descriptors. The color calibration component 120 can apply a dimensionality reduction operation on the extracted color descriptors (e.g., using principal component analysis or any suitable dimensionality reduction technique). As discussed above, such a dimensionality reduction can improve the performance and accuracy of data models that analyze the extracted color descriptors. In such an embodiment, the color calibration component 120 then projects the ColorChecker color descriptors onto the previously reduced color subspace. Additionally, the color calibration component 120 could apply a metric learning operation on the color descriptors extracted from the object image using the color descriptors extracted from the ColorChecker image.

The color calibration component 120 then combines the color and texture metrics into a unified patch metric, and combines the individual patch metrics for the object image into an aggregate distance measure. The color calibration component 120 could then use the aggregate distance measure to re-identify objects appearing within images captured using various different camera devices of the camera devices 140(1)-(N). Doing so provides an improved unsupervised learning technique for object re-identification which is capable of accounting for variances in the color subspace across the various camera devices 140(1)-(N).

Figure 2:
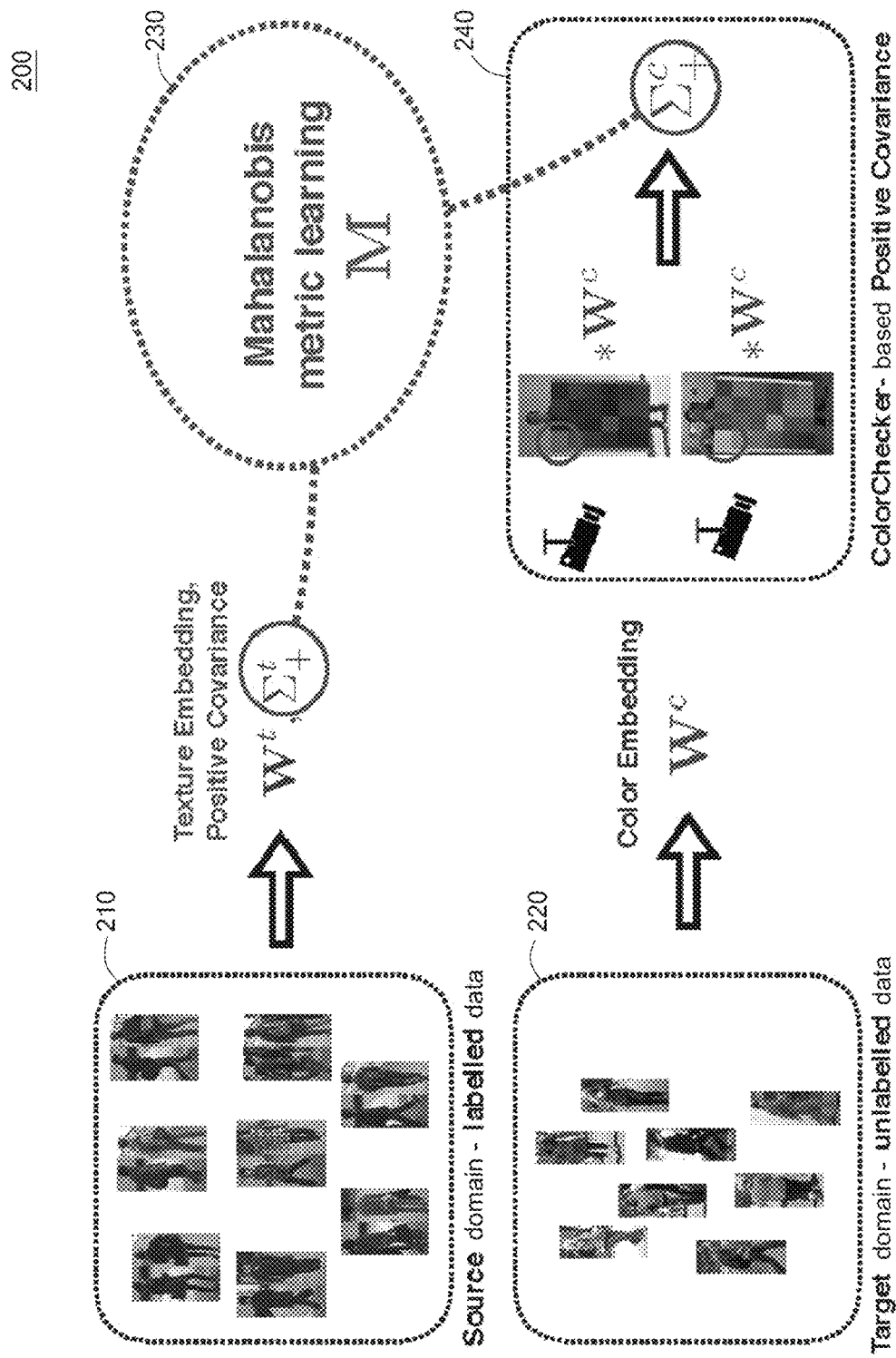
FIG. 2 illustrates a workflow for calibrating camera devices for use in modelling appearances of objects in images across multiple video feeds, according to one embodiment described herein.

FIG. 2 illustrates a workflow for calibrating camera devices for use in modelling appearances of objects in images across multiple video feeds, according to one embodiment described herein. As shown, the workflow 200 includes a source domain of labelled texture data 210 and a target domain of unlabeled color data 220. The source domain of labelled texture data 210 refers to texture data determined from one or more auxiliary data sets (e.g., annotated image libraries, depicting objects across non-overlapping camera devices, which may be captured using camera devices 140(1)-(N) or other camera devices). As texture data is generally constant across different camera devices, the color calibration component 120 can learn the covariance of texture feature differences $\Sigma_+^t$ from the one or more auxiliary data sets. In the depicted example, the color calibration component 120 processes texture data from the source domain 210 using a Mahalanobis metric learning algorithm at block 230.

The target domain of unlabeled color data 220 represents unlabeled data captured from the target domain in which the cameras 140(1)-(N) are deployed. The color calibration component 120 learns a color embedding $W^c$ from the unlabeled data 220 and then applies the learned color embedding to patches extracted from registered images of a color calibration chart captured using the non-overlapping cameras 140(1)-(N). The color calibration component 120 estimates the positive covariance of color feature differences $\Sigma_+^c$ from these corresponding patches.

For the following discussion $x_i$ and $x_j$ are defined as feature representations of bounding boxes i and j from cameras p and q, respectively. For example, such feature representations can include a concatenation of color histograms, dense Scale Invariant Feature Transform (SIFT), Histogram of Oriented Gradients (HOG), Local Binary Pattern (LBP), etc.

Moreover, $\mathcal{H}^+$ represents the hypothesis that $x_i$ and $x_j$ are two distinct views of the same object, and $\mathcal{H}^-$ represents the hypothesis that the two views are of different objects. From a Bayesian point of view, the optimal decision as to whether $x_i$ and $x_j$ represent the same object or not, can be made through a likelihood ratio test involving the difference $x_{ij}=x_i-x_j$ of features, where $\delta(i,j) \to -\infty$ implies that $x_i$ and $x_j$ are the same object, as shown below in Equation 1.

$$\delta(i, j) = \log \frac{P(x_{ij} \mid \mathcal{H}^-)}{P(x_{ij} \mid \mathcal{H}^+)}$$ Equation 1-Likelihood Ratio Test The numerator represents the conditional probability that the features $x_i$ and $x_j$ are two views of different objects, and the denominator represents the conditional probability that the features $x_i$ and $x_j$ are two views of the same object. To implement the Likelihood Ratio Test shown in Equation 1, the two conditional probabilities from the numerator and the denominator can be modeled as multivariate Gaussian distributions $\mathcal{N}(0, \Sigma_-)$ and $\mathcal{N}(0, \Sigma_+)$. As the densities are zero-mean because of the symmetry of differences (i.e., for each $x_{ij}=x_i-x_j$ exists $x_{ji}=x_j-x_i$), the likelihood ratio resembles the difference of Mahalanobis distances. As the difference between the Mahalanobis distances is relatively easier to compute computationally, the formulation, shown in Equation 2, is generally suitable for re-identification, due to its relative simplicity and effectiveness.

$$\delta(i,j)=x_{ij}^T(\Sigma_+^{-1} - \Sigma_-^{-1})x_{ij}$$ Equation 2—Difference of Mahalanobis Distances Color calibration component 120 may implement $x_i$ and $x_j$ as low-dimensional projections of high-dimensional feature vectors $b_i$ and $b_j$ extracted from image data (e.g., a concatenation of color histograms, dense SIFT, HOG, LBP, etc.). Such low-dimensional representations can make the inverse covariance matrices of Equation 2 (i.e., $\Sigma_-^{-1}$ and $\Sigma_+^{-1}$) more practical to compute. Moreover, by using such low-dimensional representations, the color calibration component 120 can avoid over-fitting the model while estimating the covariance matrices (e.g., the positive covariance of color feature differences and texture feature differences). In one embodiment, the color calibration component 120 is configured to use Principal Component Analysis (PCA) to reduce the dimensionality of the feature representations.

The color calibration component 120 is configured to operate on patches, rather than the entire bounding box within an image. A bounding box may be represented as a concatenation of K per-patch features. As a result, the dissimilarity between two bounding boxes (quantified by Equation 2) when operating on patches is shown in Equation 3.

Equation 3-Bounding Box Dissimilarity $$\delta(i, j) = \sum_{k=1}^{K} (p_{ij}^k)^T M_k p_{ij}^k,$$

where $$M_k = \left(\Sigma_+^k\right)^{-1} - \left(\Sigma_-^k\right)^{-1}$$

In practice, $p_i^k$ is usually a low-dimensional representation of high-dimensional patch features $r_i^k$, and typically the dimensionality reduction technique is invariant to the patch location k. In one embodiment, at block 230, the color calibration component 120 is configured to learn a Mahalanobis distance metric $M_k$ for each patch. Generally, such Mahalanobis distance metric can directly model the transition in the feature space between two camera views, thus achieving better performance than the similarity functions directly learned in the original feature space. In a particular embodiment, the color calibration component 120 is configured to learn a single metric M (at block 230) that is common to all patches, which in turn drastically increases the amount of training data and, in turn, improves generalization performance. Such a metric M is shown in Equation 4.

$$M = \Sigma_+^{-1} - \Sigma_-^{-1}.$$ Equation 4—Bounding Box Dissimilarity M Metric In one embodiment, the color calibration component 120 treats the $B_p$ and $B_q$ of bounding box locations from cameras p and q as available, but the labellings indicating which bounding boxes correspond to images of the same object as unavailable. Additionally, techniques disclosed herein may define each high-dimensional feature vector $r_i^k$ extracted for each patch (across all bounding boxes) as a combination of color $u_i^k$ and texture $v_i^k$ descriptors (color histograms, dense SIFT, etc.).

The color calibration component 120 may generate the low-dimensional patch feature $p_i^k$ using a suitable dimensionality reduction technique (e.g., PCA) and may process the color and texture descriptors independently, as shown in Equation 5, where $W_c$ represents the color calibration chart-based positive covariance matrix, $u_i^k$ represents a color descriptor, $W_t$ represents the learned positive covariance matrix, $v_i^k$ represents a texture descriptor, $c_i^k$ represents the extracted color feature vector, and $t_i^k$ represents the extracted texture feature vector.

Equation 5-Low dimensionality patch feature
$$\begin{aligned} p_i^k &= [\, W_c u_i^k \quad W_t v_i^k \,], \\ &= [\, c_i^k \quad t_i^k \,], \\ &\approx W r_i^k, \end{aligned}$$

While the color calibration component 120 learns positive examples of objects detected across multiple images from multiple camera devices from training data sets, the color calibration component 120 can generate a set of negative examples by randomly selecting bounding boxes from $B_p$ and $B_q$. By doing so, even when the randomly generated bounding boxes correspond to the same object, the odds of this happening frequently are low. Therefore, the covariance of the negative examples can be computed from the random sampling shown in Equation 6, where $p_{ij}^-$ represents a negative example determined via random (or pseudo-random) sampling.

$$\Sigma_- = \Sigma (p_{ij}^-)(p_{ij}^-)^T.$$ Equation 6—Negative Example Covariance With regard to positive covariance, similar to the dimensionality compression using PCA, the color calibration component 120 can be configured to assume the low-dimensional per-patch color and texture descriptors of positive examples are independent, which means the positive covariance matrix is in the form shown in Equation 7.

$$\Sigma_+ = \begin{bmatrix} \alpha \Sigma_+^c & 0 \\ 0 & (1-\alpha)\Sigma_+^t \end{bmatrix},$$ Equation 7-Positive Example Covariance where $$\Sigma_+^c = \Sigma (c_{ij}^+)(c_{ij}^+)^T,$$
$$\Sigma_+^t = \Sigma (t_{ij}^+)(t_{ij}^+)^T.$$

$\Sigma_+^c$ represents the positive covariance of the low-dimensional color descriptors, $E_+^t$ represents the positive covariance of low-dimensional texture descriptors, $c_{i,j}$ represents the extracted color feature vector at (i,j), $t_{i,j}$ represents the extracted texture feature vector at (i,j), and a controls the importance of color on the current dataset relative to its importance in the reference dataset from which $W_t$ and $E_+^t$ were learned.

For purposes of the present disclosure, the covariance $E_+^t$ of the low-dimensional texture descriptors is invariant between camera pairs, and thus the color calibration component 120 can learn the covariance $E_+^t$ using an annotated auxiliary dataset (i.e., annotated image data of common objects across different cameras, captured using any cameras and not restricted to images captured using the cameras 140(1)-(N)). On the other hand, the color calibration component 120 can learn the projection $W_c$ of color features from the sets of input bounding boxes for the specific pair of cameras (since PCA does not need labelled examples). The color calibration component 120 can learn the positive covariance $\Sigma_+^c$ of the low-dimensional color descriptors from a single pair of registered images of a color calibration target (shown in FIG. 5A).

Figure 3:
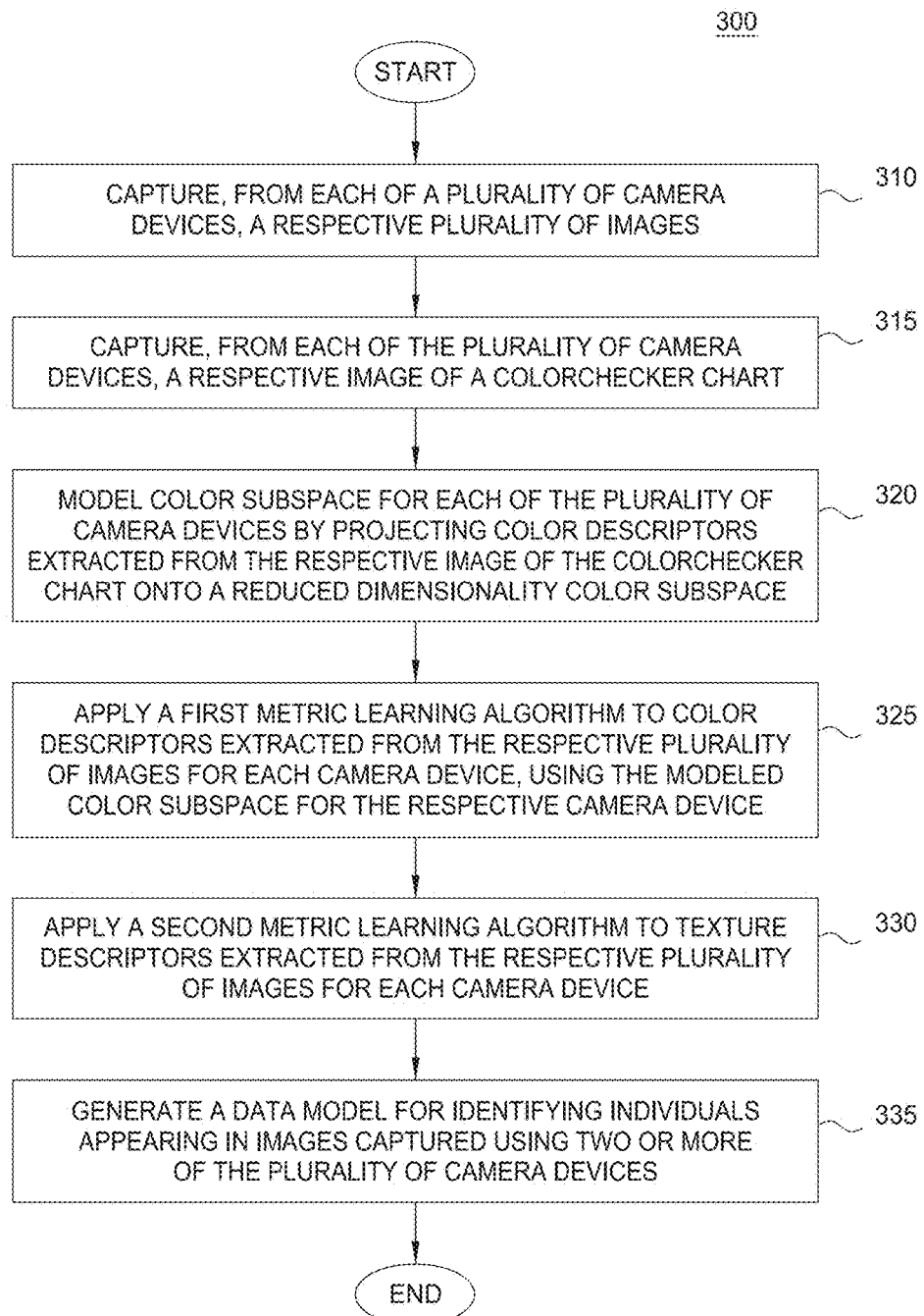
FIG. 3 is a block diagram illustrating a method of modelling appearances of objects in images across multiple video feeds, according to one embodiment described herein.

FIG. 3 is a block diagram illustrating a method 300 of modelling appearances of objects in images across multiple video feeds. At block 310, where the color calibration component 120 captures, from each of the plurality of cameras 140(1)-(N), a respective plurality of images 125. The cameras 140(1)-(N) can be configured to periodically capture images (e.g., one image per second) and the images can be transmitted (e.g., across a data communications network) to a server configured with the color calibration component 120 for further analysis. A respective reference image of a color calibration chart is captured from each of the plurality of cameras 140(1)-(N) (block 315). Generally, such captured images can be in a raw image format or a compressed image format (such as the Joint Photographic Experts Group (JPEG) format, the Portable Network Graphics (PNG) format, etc.).

A color subspace is modelled for each of the plurality of camera devices at operation 320, by projecting color descriptors extracted from the respective reference image of the color calibration target onto a reduced dimensionality color subspace. A first metric learning algorithm is applied to color descriptors extracted from the respective plurality of images for each camera device, using the modeled color subspace for the respective camera device at operation 325.

A second metric learning algorithm is applied to texture descriptors extracted from the respective plurality of images for each camera devices at block 330. By applying the first metric learning algorithm to the color descriptors and the second metric learning algorithm to the texture descriptors, the color calibration component 120 models the texture descriptors independently from the color descriptors extracted from the images. A data model for identifying objects appearing in images captured using two or more of the plurality of camera devices is generated at block 335.

Figure 4:
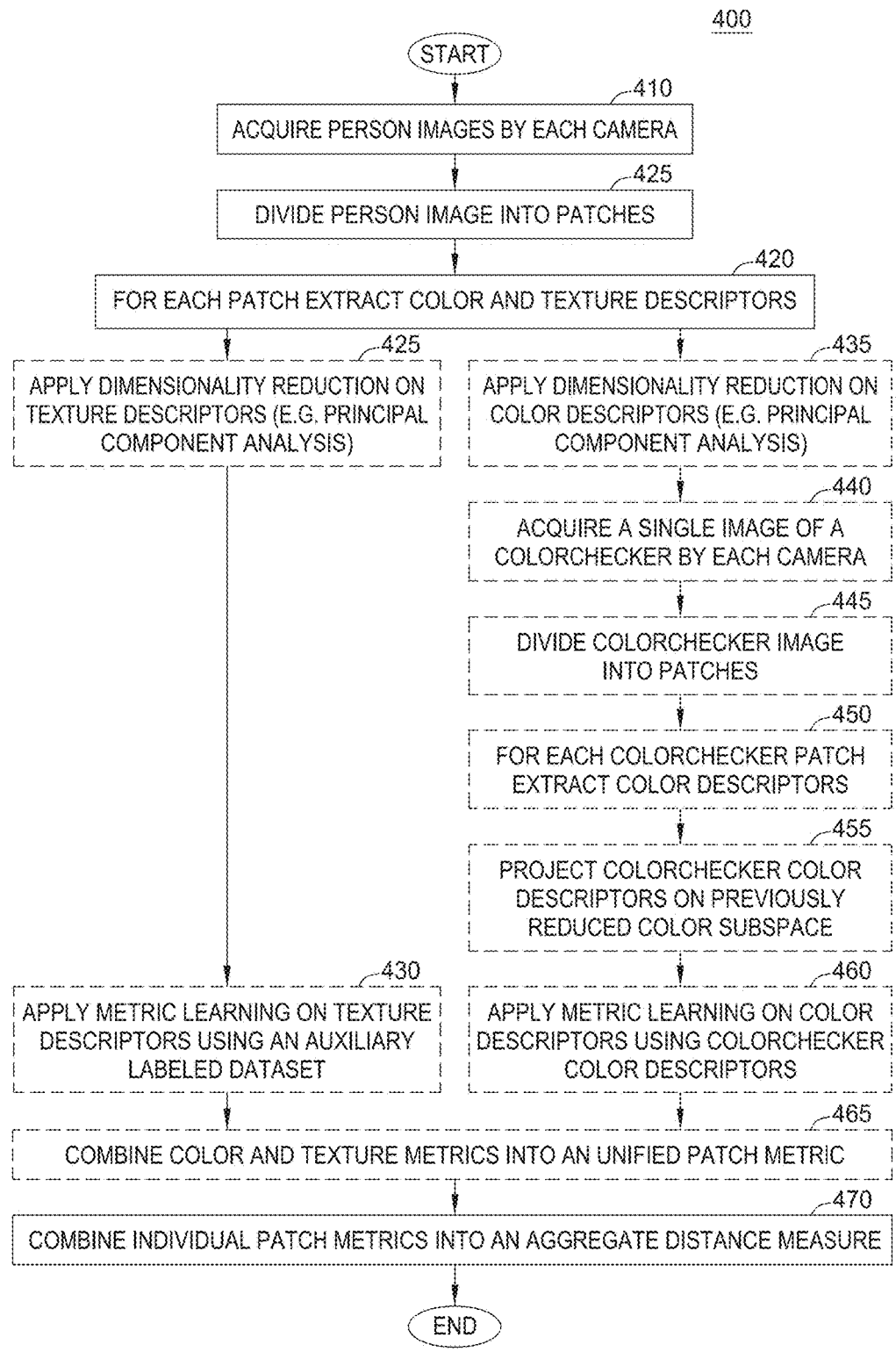
FIG. 4 is a block diagram illustrating a method of generating an aggregate distance function for identifying objects in images across multiple video feeds, according to one embodiment described herein.

FIG. 4 is a block diagram illustrating a method 400 of generating an aggregate distance function for identifying objects in images across multiple cameras 140(1)-(N). The color calibration component 120 acquires object images from each of a plurality of camera devices at operation 410. Each object image is divided into a plurality of patches at operation 425. For example, each patch could be a portion of an image of a predefined size, e.g., 24 by 12 pixels.

Color and texture descriptors are extracted for each patch for each image at operation 420. A dimensionality reduction algorithm is applied on the extracted texture descriptors (e.g., using principal component analysis) at operation 425, and, at operation 430, a metric learning algorithm is applied to the texture descriptors using an auxiliary labeled dataset. Such an auxiliary dataset can include annotated images captured using camera devices (e.g., camera devices other than the cameras 140(1)-(N)), as the learned texture descriptors are relatively constant across cameras.

Additionally, a dimensional reduction is applied on the extracted color descriptors, e.g., principal component analysis, at block 435. The color calibration component 120 further acquires a respective reference image of a color calibration target for each of the camera devices (block 440). Such an image can be stored in any suitable format (e.g., a raw format, a compressed format, etc.) and can be transmitted over a data communications network for analysis by the color calibration component 120. The reference image of the color calibration chart is divided into a plurality of patches at operation 445, and for each patch, a respective color descriptor is extracted at block 450.

The color descriptors extracted from the patches of the reference image of the color checker chart are projected onto the previously reduced color subspace (block 455). At operation 460, a metric learning algorithm is applied on the color descriptors extracted from the object images using the projected color descriptors for the respective camera device. At block 465, the color calibration component 120 combines the color and texture metrics into a unified patch metric. The color calibration component 120 combines the individual patch metrics into an aggregate distance measure (block 470).

Figures 5A, 5B:
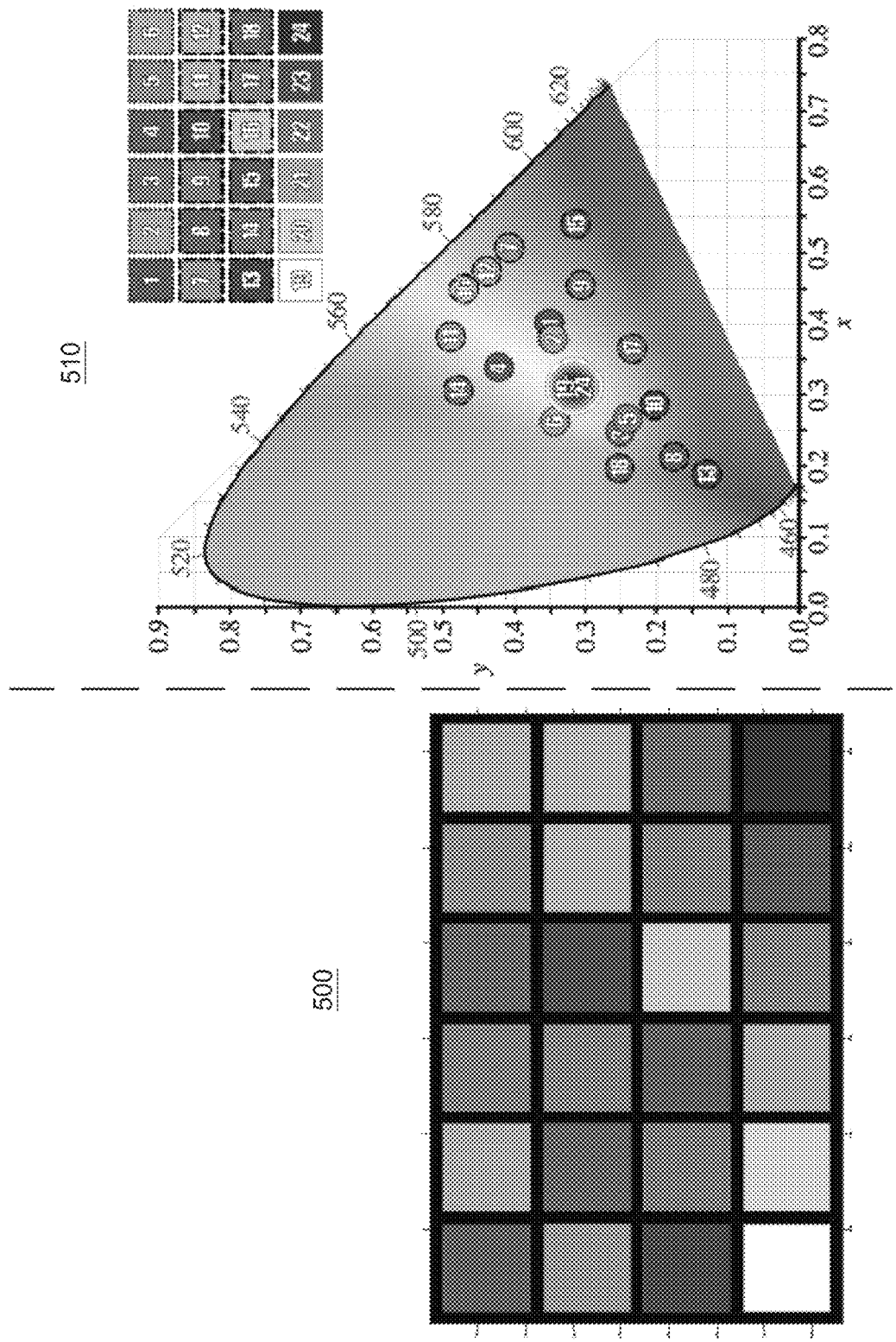
FIGS. 5A-B illustrate a mapping of a color space for a calibrated camera device, according to one embodiment described herein.

FIG. 5A illustrates a color calibration chart, according to one embodiment. As shown, the chart 500 comprises color patches similar to natural objects such as human skin, foliage, and flowers. Such a chart is generally designed to evaluate color reproduction processes by comparing images captured of the chart to the original chart. FIG. 5B illustrates a mapping 510 of the colors from the color calibration chart 500 onto a color space.

To generate a set of $\{c^+\}$ of per-patch color features from positive examples, the color calibration component 120 can register images of the color calibration chart 500 acquired from two different cameras using manually defined point correspondences. In doing so, the color calibration component 120 can extract a low-dimensional patch feature from each color square to produce a set of feature differences. The color calibration component 120 can further randomly sample patches in off-grid locations and the color calibration component 120 can compute color differences therebetween. Generally, sampling from off-grid locations generates more training samples that linearly interpolate the space of feature differences.

According to one embodiment, the colored regions of the color calibration chart 500 are almost completely homogeneous. In a particular embodiment, to make the extracted features more representative of features that would be extracted from clothing in hand-labelled example image pairs, the color calibration component 120 can apply kernel density estimation. For purposes of the following discussion, assume that each extracted color feature vector $c_i^k$ can be written in the form shown in Equation 8.

$$c_i'(z) = \sum_{j=1}^{N} G(z - z_j, \theta),$$

where $\theta$ is the bandwidth parameter of the Gaussian kernel G $$G(x, \theta) = \exp\left(-\frac{x^2}{2\theta^2}\right).$$

Equation 8-Extracted Color Feature Vector

The estimate of feature vector differences can be expressed, as shown in Equation 9.

$$c_{ij}^+ = c_{ij}^{(p)+} \cup c_{ij}^{(r)+} \cup c'_{ij}^{(p)+} \cup c'_{ij}^{(r)+}$$

Equation 9—Estimated Color Feature Vector Differences

The color calibration component 120 can use such an estimate to estimate the positive example covariance value (e.g., using Equation 7 shown above). The color calibration component 120 can then compute the M metric, e.g., using Equation 4 shown above. Additionally, the color calibration component 120 can compute the bounding box dissimilarity likelihood ratio (e.g., using Equation 3) using the computed M metric. Such a process is summarized in Algorithm 1, shown below.

---

Algorithm 1: Color Calibrated Metric Learning (CML) algorithm

---

Data: People images from cameras p and q:
    $B = \{B_1^p, B_2^p, \ldots, B_N^p, B_1^q, B_2^q, \ldots, B_M^q\}$,
    ColorChecker images from camera p and camera q
    $A = \{A^p, B^q\}$
    Partial PCA subsapce $W_t$
    Low-dimensional Texture Covariance $\Sigma_+^t$
Result: Dissimilarity metric for patches M
begin
|     Compute partial PCA subspace $W_c$ using $u_i^k$ from B
|     Compute $\Sigma_-$ using random sampling from B and embedding $[W_c\ W_t]$
|     Compute $c_i^k$ for all patches in B using $W_c$
|     Estimate $c_{ij}^+ = c_{ij}^{(p)+} \cup c_{ij}^{(r)+} \cup c'_{ij}^{(p)+} \cup c'_{ij}^{(r)+}$
|     Compute $\Sigma_+$
|_     $M = \Sigma_+^{-1} - \Sigma_-^{-1}$ Algorithm 1—Color Calibrated Metric Learning Algorithm The color calibration component 120 can then use aggregate distance measure for re-identifying objects appearing in frames across two or more camera devices within a network of camera devices. For example, the color calibration component 120 could determine that two images, captured from two different camera devices, both depict the same object, when the aggregate distance measure between two images is less than a predefined threshold amount of distance. Doing so enables the color calibration component 120 to accurately re-identify objects across multiple, non-overlapping camera devices, with minimal supervision and labelling of color descriptors within a training set.

Figure 6:
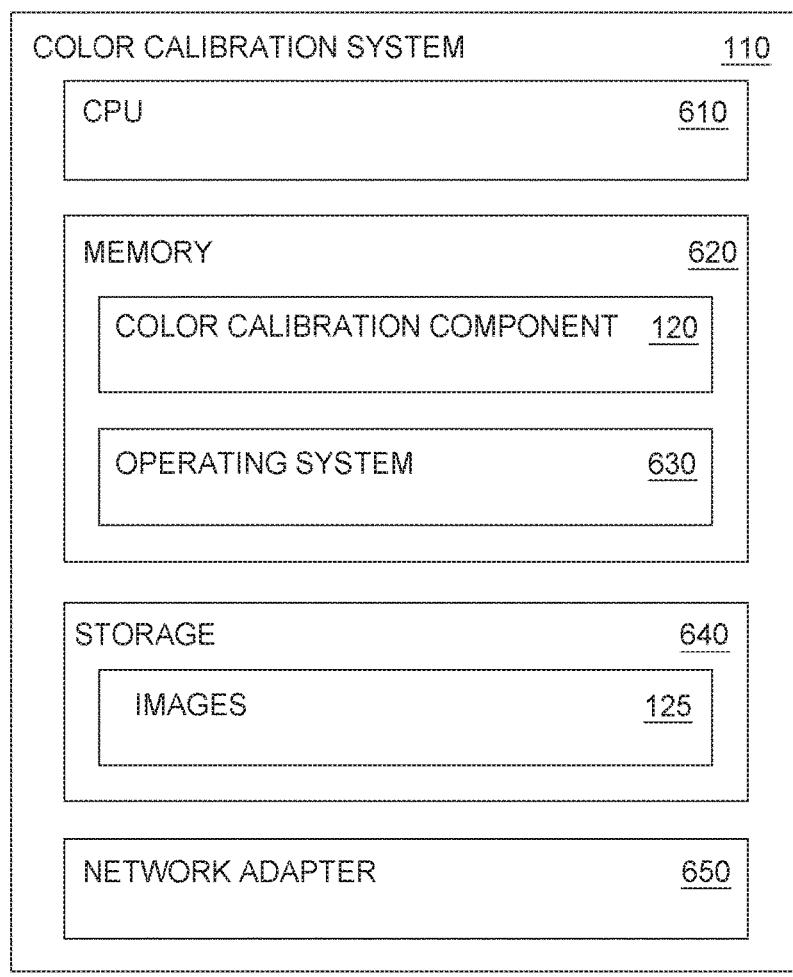
FIG. 6 is a block diagram illustrating a system configured to execute a color calibration component, according to one embodiment described herein.

FIG. 6 depicts one architecture of a system 600 within which embodiments of the present disclosure may be implemented. This figure in no way limits or is intended to limit the scope of the present disclosure. System 600 may be a desktop computer, video game console, digital assistant, rendering engine, or any other device suitable for practicing one or more embodiments of the present disclosure.

As shown, system 600 includes a central processing unit (CPU) 610, a memory 620, storage 640 and a network adapter 650. CPU 610 includes one or more processing cores, and, in operation, CPU 610 is the master processor of system 600, controlling and coordinating operations of other system components. The system memory 620 stores software applications and data for use by CPU 610, and as shown, the memory 620 includes the color calibration component 110 and an operating system 630.

Storage 640 represents non-volatile storage for applications and data and may include fixed or removable hard disk drives, flash memory devices, and CD-ROM, DVD-ROM, Blu-ray, HD-DVD, or other magnetic, optical, or solid state storage devices. The storage 640 (which can be connected to the CPU 610 via an I/O bridge, not shown) may be configured to store content and applications and data for use by CPU 610. As shown, storage 640 contains images 125, which represent images captured from cameras 140(1)-(N).

Network adapter 650 allows the system 600 to communicate with other systems via an electronic communications network, and may include wired or wireless communication over local area networks and wide area networks such as the Internet. For example, the images 125 can be received over a data communications network by the network adapter 650 from the cameras 140(1)-(N) and stored in the storage 640, e.g., until analyzed by the color calibration component 110.

In the preceding, reference is made to embodiments of the invention. However, it should be understood that the invention is not limited to specific described embodiments. Instead, any combination of the described features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The preceding flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
capturing, using a first camera device and a second camera device, a first plurality of images and a second plurality of images, respectively;
capturing, using the first and second camera devices, a first reference image and a second reference image;
extracting color descriptors from the first plurality of images and the second plurality of images;
extracting texture descriptors from the first plurality of images and the second plurality of images;
modelling a first color subspace and a second color subspace for the first camera device and the second camera device, respectively, based on the first and second pluralities of images and the first and second reference images;
generating a data model for identifying objects appearing in images captured using the first and second camera devices, based on the extracted color descriptors, texture descriptors and the first and second color subspaces; and
determining that a first image captured using the first camera device and a second image captured using the second camera device contain a depiction of a same object using the generated data model, comprising:
analyzing two or more patches across the first image and the second image, to determine that the two or more patches depict the same object, based on aggregate distance values calculated for the two or more patches using an aggregate distance function that combines unified patch metrics, and wherein the unified patch metrics include extracted color descriptors and extracted texture descriptors from a plurality of patches within the first and second pluralities of images.

2. The method of claim 1, wherein modelling the first color subspace further comprises:
projecting color descriptors extracted from the first reference image onto a reduced dimensionality color subspace.

3. The method of claim 2, wherein generating the data model further comprises:
applying a first metric learning algorithm to the color descriptors extracted from the first plurality of images, using the first color subspace.

4. The method of claim 3, wherein generating the data model further comprises:
applying a second learning metric to the texture descriptors extracted from the first plurality of images.

5. The method of claim 1, wherein each of the first and second reference images includes a depiction of a colorchecker chart.

6. The method of claim 5, wherein the colorchecker chart comprises a grid of colored squares, wherein each of the colored squares in the grid of colored squares corresponds to a distinct color.

7. The method of claim 1, further comprising:
dividing a first image of the first plurality of images into the plurality of patches, wherein each patch comprises a distinct portion of the respective image.

8. The method of claim 7, wherein generating the data model further comprises:
for a first one of the plurality of patches, combining a corresponding extracted color descriptor and a corresponding extracted texture descriptor into a first unified patch metric.

9. The method of claim 8, further comprising:
combining the first unified patch metric and at least a second unified patch metric corresponding to a second patch of the plurality of patches into the aggregate distance function.

10. A system, comprising:
one or more computer processors; and
a memory containing computer program code that, when executed by operation of the one or more computer processors, performs an operation comprising:
capturing, using a first camera device and a second camera device, a first plurality of images and a second plurality of images, respectively;
capturing, using the first and second camera devices, a first reference image and a second reference image;
extracting color descriptors from the first plurality of images and the second plurality of images;
extracting texture descriptors from the first plurality of images and the second plurality of images;
modelling a first color subspace and a second color subspace for the first camera device and the second camera device, respectively, based on the first and second pluralities of images and the first and second reference images;
generating a data model for identifying objects appearing in images captured using the first and second camera devices, based on the extracted color descriptors, texture descriptors and the first and second color subspaces; and
determining that a first image captured using the first camera device and a second image captured using the second camera device contain a depiction of a same object using the generated data model, comprising:
analyzing two or more patches across the first image and the second image, to determine that the two or more patches depict the same object, based on aggregate distance values calculated for the two or more patches using an aggregate distance function that combines unified patch metrics, and wherein the unified patch metrics include extracted color descriptors and extracted texture descriptors from a plurality of patches within the first and second pluralities of images.

11. The system of claim 10, wherein modelling the first color subspace further comprises:
projecting color descriptors extracted from the first reference image onto a reduced dimensionality color subspace.

12. The system of claim 11, wherein generating the data model further comprises:
applying a first metric learning algorithm to the color descriptors extracted from the first plurality of images, using the first color subspace.

13. The system of claim 12, wherein generating the data model further comprises:
applying a second learning metric to the texture descriptors extracted from the first plurality of images.

14. The system of claim 10, wherein each of the first and second reference images includes a depiction of a colorchecker chart, wherein the colorchecker chart comprises a grid of colored squares, wherein each of the colored squares in the grid of colored squares corresponds to a distinct color.

15. The system of claim 10, the operation further comprising:
dividing a first image of the first plurality of images into a plurality of patches, wherein each patch comprises a distinct portion of the respective image.

16. The system of claim 15, wherein generating the data model further comprises:
for a first one of the plurality of patches, combining a corresponding extracted color descriptor and a corresponding extracted texture descriptor into a first unified patch metric, and
the operation further comprising combining the first unified patch metric and at least a second unified patch metric corresponding to a second patch of the plurality of patches into an aggregate distance function.

17. A non-transitory computer-readable medium containing computer program code that, when executed by operation of one or more computer processors, performs an operation comprising:
capturing, using a first camera device and a second camera device, a first plurality of images and a second plurality of images, respectively;
capturing, using the first and second camera devices, a first reference image and a second reference image;
extracting color descriptors from the first plurality of images and the second plurality of images;
extracting texture descriptors from the first plurality of images and the second plurality of images;
modelling a first color subspace and a second color subspace for the first camera device and the second camera device, respectively, based on the first and second pluralities of images and the first and second reference images;
generating a data model for identifying objects appearing in images captured using the first and second camera devices, based on the extracted color descriptors, texture descriptors and the first and second color subspaces; and
determining that a first image captured using the first camera device and a second image captured using the second camera device contain a depiction of a same object using the generated data model, comprising:
analyzing two or more patches across the first image and the second image, to determine that the two or more patches depict the same object, based on aggregate distance values calculated for the two or more patches using an aggregate distance function that combines unified patch metrics, and wherein the unified patch metrics include extracted color descriptors and extracted texture descriptors from a plurality of patches within the first and second pluralities of images.

* * * * *